(12) United States Patent
Krupezevic et al.

(10) Patent No.: US 11,398,649 B2
(45) Date of Patent: Jul. 26, 2022

(54) BATTERY DEVICE

(71) Applicant: Robert Bosch GmbH, Stuttgart (DE)

(72) Inventors: Dragan Krupezevic, Stuttgart (DE); Guenter Lohr, Leinfelden-Echterdingen (DE); Juergen Mack, Goeppingen (DE); Martin Gonda, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 396 days.

(21) Appl. No.: 16/484,979

(22) PCT Filed: Feb. 1, 2018

(86) PCT No.: PCT/EP2018/052514
§ 371 (c)(1),
(2) Date: Sep. 25, 2019

(87) PCT Pub. No.: WO2018/145988
PCT Pub. Date: Aug. 16, 2018

(65) Prior Publication Data
US 2020/0388889 A1 Dec. 10, 2020

(30) Foreign Application Priority Data
Feb. 10, 2017 (DE) .......................... 102017202167.5

(51) Int. Cl.
*H01M 10/44* (2006.01)
*H02J 50/10* (2016.01)
*H02J 7/00* (2006.01)
*H01M 10/42* (2006.01)
*H01M 10/46* (2006.01)

(52) U.S. Cl.
CPC ....... *H01M 10/441* (2013.01); *H01M 10/425* (2013.01); *H01M 10/46* (2013.01);
(Continued)

(58) Field of Classification Search
CPC ........... H01M 10/4207; H01M 10/425; H01M 10/4257; H01M 10/441; H01M 10/46;
(Continued)

(56) References Cited

U.S. PATENT DOCUMENTS 6,781,347 B1 8/2004 Smith
2010/0327804 A1 12/2010 Takahashi et al.
(Continued)

FOREIGN PATENT DOCUMENTS

DE 102013217710 A1 5/2014
DE 102013226232 A1 6/2014
(Continued)

OTHER PUBLICATIONS

Machine Translation JP2004028777A (Year: 2004).*
(Continued)

*Primary Examiner* — Victoria H Lynch
(74) *Attorney, Agent, or Firm* — Norton Rose Fulbright US LLP; Gerard Messina

(57) ABSTRACT

A battery device, which has a battery cell unit and at least one induction interface and, in at least one reception operating state, is configured to receive electrical energy by induction for charging the battery cell unit. The battery device includes at least one electrical load, which is activateable above a defined state of charge of the battery cell unit.

12 Claims, 1 Drawing Sheet

(52) U.S. Cl.
CPC .......... *H02J 7/00302* (2020.01); *H02J 50/10* (2016.02); *H01M 2010/4271* (2013.01); *H01M 2220/30* (2013.01)

(58) Field of Classification Search
CPC ....... H01M 2010/4271; H01M 2220/30; H02J 50/10; H02J 7/0029; H02J 7/00302; Y02E 60/10
See application file for complete search history.

(56) References Cited

U.S. PATENT DOCUMENTS

| | | | |
|---|---|---|---|
| 2013/0302660 A1 | 11/2013 | Shiraishi et al. | |
| 2014/0266026 A1* | 9/2014 | Dowd | H02J 50/80 320/108 |
| 2015/0180257 A1 | 6/2015 | Snyder et al. | |

FOREIGN PATENT DOCUMENTS

| | | |
|---|---|---|
| DE | 102014219504 A1 | 3/2016 |
| EP | 3197016 A1 | 7/2017 |
| JP | 2004028777 A | 1/2004 |
| WO | 2016042776 A1 | 3/2016 |

OTHER PUBLICATIONS

International Search Report dated Apr. 25, 2018 of the corresponding International Application PCT/EP2018/052514 filed Feb. 1, 2018.

* cited by examiner

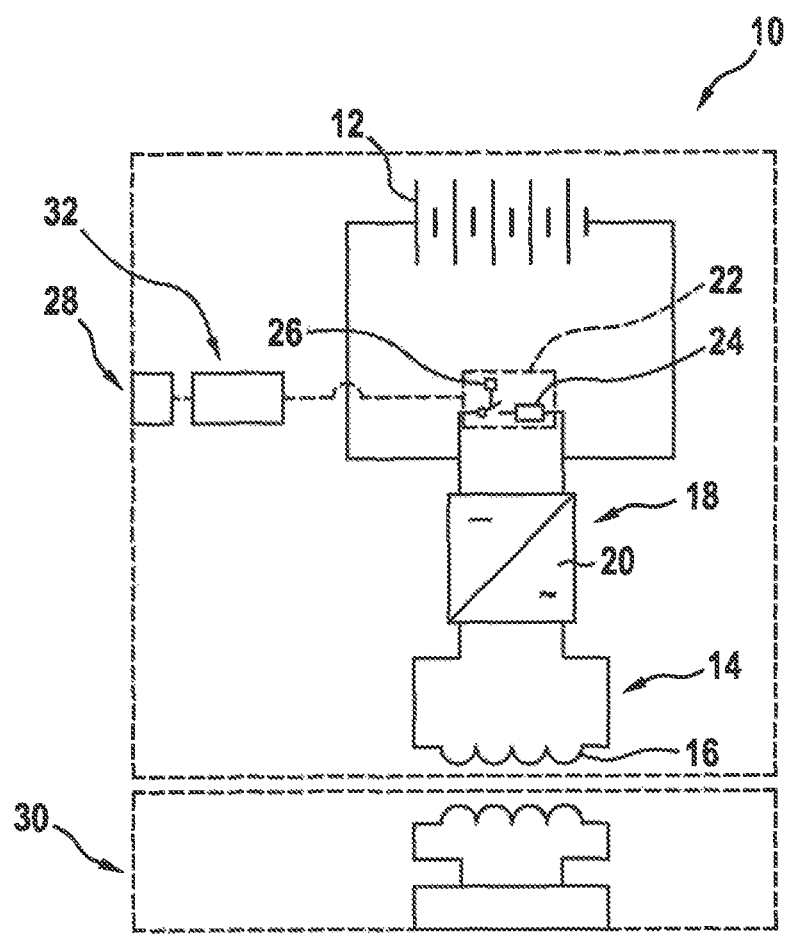

BATTERY DEVICE

FIELD OF THE INVENTION

The present invention relates to a battery device, which has a battery cell unit and at least one induction interface.

BACKGROUND INFORMATION

A battery device, which has a battery cell unit and at least one induction interface and is configured to receive, in at least one reception operating state, electrical energy for charging the battery cell unit by induction, is believed to have been proposed.

SUMMARY OF THE INVENTION

The present invention is directed to a battery device, which has a battery cell unit and at least one induction interface and is configured to receive, in at least one reception operating state, electrical energy for charging the battery cell unit by induction.

It is provided that the battery device include at least one electrical load, which is intended to be activated above a defined state of charge of the battery cell unit. In this manner, overcharging, in particular, due to wake-up and/or synchronization pulses, may be advantageously prevented. In addition, the state of charge may be reduced, as needed.

In this connection, a "battery device" is to be understood as, in particular, a device, which is provided, in particular, for storing electrical energy at least temporarily. In particular, a rechargeable energy storage device should be understood by it. In this connection, a "battery cell unit" is to be understood as, in particular, a rechargeable energy storage unit, which has at least one battery cell, is configured to be charged via introduction of a charging current, and/or is provided for storing electrical energy at least temporarily. In particular, the battery cell unit may include at least one battery cell block, in which a plurality of battery cells are connected in parallel and/or in series.

In particular, a "battery cell" is intended to be understood as a unit, which is provided for electrochemical storage of electrical energy via a reversible reaction. For example, the battery cell may be made up of a lead battery cell, a NiCd battery cell, a NiMH battery cell, but which may be a lithium-based battery cell. The battery cell may be made up of battery cells of different nominal voltages, such as nominal voltages of 1.2 V, 1.5 V or 3.6 V. The battery cell may have a cylindrical shape. The battery cell unit may include a plurality of battery cells, which are connected in parallel and/or in series, in order to attain a higher overall capacity and/or a higher overall voltage of the battery device. For example, the battery cell unit may include a battery cell having a voltage of 3.6 V, two battery cells connected in series, which each have a voltage of 3.6 V for an overall voltage of the battery device of 7.2 V, or three battery cells connected in series, which each have a voltage of 3.6 V for an overall voltage of the battery device of 10.8 V.

In particular, an "induction interface" is intended to be understood as an electronic unit, which, in a reception operating state, is configured to receive electrical energy via induction from at least one transmitter for charging the battery cell unit, to convert it, and/or to process it and supply it to the battery cell unit. The at least one induction interface may include at least one induction coil. In particular, the induction coil is configured to convert an alternating electromagnetic field to an alternating electrical current. The alternating field may have a frequency of 10-500 kHz, particularly, 100-150 kHz. In particular, the direction is perpendicular to the coil plane, parallel to a coil axis of the induction coil.

In this connection, an "induction coil" shall be understood as, in particular, a coil having at least one winding made of an electrically conductive material; in a reception operating state of the induction interface, the induction coil being configured to receive electrical energy, which is transmitted by an induction coil of an inductive charging device, and to supply it to a battery cell via charging electronics. In particular, the induction coil is made up at least partially of an electrical conductor, in particular, a coiled electrical conductor, which is arranged, in particular, at least partially in the shape of a circular disk.

"Charging electronics" shall be understood to be, in particular, an electronic unit, which is configured to control the charging of battery cells and includes, in particular, electronic elements for transforming voltage. In particular, the battery device may also include a battery housing. A "battery housing" is to be understood as, in particular, a module, which includes at least one housing component that demarcates the battery device at least partially from an environment, using outer walls, and protects it from the environment, in order to prevent damage and/or contamination.

The at least one electrical load may include at least one electrical resistor and/or a circuit controller for activating and/or changing the at least one electrical resistor. In particular, the at least one electrical load is intended to prevent overcharging of the battery cell unit.

In this connection, a "state of charge" is to be understood as, in particular, an electrical voltage and/or a storage capacity of the battery cell unit. In this connection, "activated" shall be understood as connected in such a manner, that an electrical circuit including the at least one battery cell unit is closed. In particular, the electrical load is intended to be deactivated below the defined state of charge. The wake-up and/or synchronization pulses are generated, in particular, by an inductive charging device for activation, information transmission, or synchronization with the battery device. The wake-up and/or synchronization pulses transmit energy to the induction interface of the battery device. In particular, "provided" is to be understood as, in particular, specially programmed, configured and/or equipped. That an object is provided for a particular function, is to be understood to mean that, in particular, the object fulfills and/or executes this particular function in at least one application state and/or operating state.

In one further refinement of the present invention, it is provided that the at least one electrical load be configured to prevent the state of charge from increasing above the defined state of charge. This advantageously prevents the defined state of charge from being exceeded or only allows it to be exceeded marginally in the case of wake-up and/or synchronization pulses, as well.

In addition, it is provided that, above the defined state of charge, the at least one electrical load be configured to consume, at least partially, energy supplied via the induction interface, in particular, by wake-up and/or synchronization pulses. In this manner, unwanted, excessively supplied electrical energy of the battery cell unit may be advantageously extracted. The supplied energy is advantageously consumed at least substantially, particularly, completely, by the electrical load, in particular, within an interval between two wake-up and/or synchronization pulses.

In addition, it is provided that the battery device include an input unit, via which the defined state of charge is adjustable, in particular, by a user. This advantageously allows the defined state of charge to be adjusted individually. In particular, the defined state of charge may be set via an input unit, at the factory and/or by an end user. In this connection, the input unit may include input devices, such as, in particular, control buttons, a touch-sensitive surface, a set wheel and/or an electric interface for connection of an external input device, such as, in particular, a computer, a smart phone and/or a keyboard.

In addition, it is provided that the defined state of charge be set as a maximum state of charge of the battery cell unit. In this manner, damage to the battery cell unit due to overcharging may be advantageously prevented. In this connection, the maximum state of charge is a maximum permissible voltage or at least 95% of the maximum permissible voltage. Alternatively, the maximum state of charge is a maximum permissible storage capacity or at least 95% of the maximum permissible storage capacity. Above the maximum state of charge, in particular, in the long term, the battery cell unit may suffer irreparable damage.

In addition, it is provided that the defined state of charge be set below a maximum state of charge of the battery cell unit. This may allow, in particular, a state of charge advantageous for storage to be obtained. The defined state of charge may be between 70% and 90% of a maximum state of charge of the battery cell unit.

Furthermore, it is provided that the electrical load be configured to discharge the battery cell unit, in particular, in a discharging mode, until a particular state of charge is reached. In this manner, a state of charge may be reduced as required, in particular, for a storage capacity measurement, transport and/or storage. The particular state of charge is freely adjustable or fixed. The particular state of charge may be, in particular, of equal value to the defined state of charge or less than the defined state of charge.

In addition, a system having at least one battery device of the present invention and having an inductive charging device is provided, the system being configured to monitor the state of the at least one battery device, in particular, with the aid of wake-up and/or synchronization pulses. This advantageously allows state monitoring to be carried out, in particular, monitoring of presence, storage capacity monitoring and/or an information query, while simultaneously providing a high level of protection of the battery cell unit from damage, in particular, due to overcharging.

Furthermore, a method for operating a battery device having a battery cell unit and at least one induction interface is provided; in at least one reception operating state, electrical energy for charging the battery cell unit by induction being received with the aid of the induction interface; at least one electrical load of the battery device preventing overcharging of the battery cell unit, in particular, overcharging of the battery cell unit by wake-up and/or synchronization pulses. In this manner, damage to the battery cell unit, in particular, due to wake-up and/or synchronization pulses, may be advantageously prevented.

In addition, an electronic device having a battery device of the present invention is proposed as being particularly reliable. In particular, the battery device in the electronic device may be accommodated in a receiving space of the electronic device and/or be detachably mounted to the electronic device. In this connection, an "electronic device" is to be understood as, in particular, an electronic device that may be carried by a user, such as a smart phone, a tablet, a laptop, an e-book reader, a handheld power tool, or the like, which is at least partially supplied with electrical energy by the battery device. This allows advantageous functionality to be achieved, in particular, with regard to inductive absorption of electrical energy.

In this connection, the battery device of the present invention is not intended to be limited to the application and specific embodiment described above. In particular, in order to achieve a functionality described here, the battery device of the present invention may have a number of individual elements, component parts and units different from a number given here.

Further advantages are derived from the description of the figures that follows. The drawing shows an exemplary embodiment of the present invention. The drawing, the description, and the claims include numerous features in combination. One skilled in the art will necessarily consider the features individually, as well, and unite them to form useful, further combinations.

BRIEF DESCRIPTION OF THE DRAWING

FIG. 1 shows a schematic representation of a system having a battery device and an inductive charging device.

DETAILED DESCRIPTION

FIG. 1 shows a schematic representation of a system having an inductive charging device 30 and a battery device 10. Inductive charging device 30 is only indicated schematically and is formed in a manner known to one skilled in the art. Battery device 10 is provided to supply an electronic device not shown here with electrical energy.

Battery device 10 includes a battery cell unit 12 and an induction interface 14. Induction interface 14 may be operated in a reception operating state. In the reception operating state, induction interface 14 is configured to receive electrical energy for charging battery cell unit 12 by induction. Induction interface 14 includes an induction coil 16, which is configured to receive electrical energy. Battery cell unit 12 includes a battery cell block, in which a plurality of battery cells are connected in series.

Induction interface 14 includes an electronic unit 18, which has a rectifier 20. In particular, electronic unit 18 may be at least substantially made up of a full bridge circuit, in particular, a MOSFET full bridge circuit. In the reception operating state of induction interface 14, rectifier 20 is configured to convert an a.c. voltage induced at induction coil 16 for battery cell unit 12 to a d.c. voltage, in order to allow battery cell unit 12 to charge.

Battery device 10 includes an electrical load 22. In this connection, it is, however, also conceivable for battery device 10 to include more than one electrical load 22. Electrical load 22 is configured to be activated above a defined state of charge of battery cell unit 12. Electrical load 22 includes an electrical resistor 24. Electrical load 22 further includes a circuit controller 26 for activating electrical resistor 24. To this end, circuit controller 26 may include at least a sensor not shown in further detail and/or a processing unit 32.

Electrical load 22 is intended to prevent overcharging of battery cell unit 12. To this end, a voltage of battery cell unit 12 is measured by circuit controller 26. In response to the measured voltage's exceeding a defined maximum voltage, electrical resistor 24 is activated. In this case, an electrical circuit between a positive pole and a negative pole of battery cell unit 12 is closed. In this context, electrical load 22 converts electrical energy of battery cell unit 12 to thermal energy. Electrical load 22 has a heating power of more than 0.1 W. In this connection, however, it is also conceivable for electrical load 22 to have a heating power of more than 1 W or more than 10 W. In addition, it is conceivable for electrical load 22 to include a cooling body, in particular, cooling fins, in order to dissipate heat. Electrical load 22 is situated inside of the same housing as battery cell unit 12.

Electrical load 22 is configured to prevent the state of charge from increasing above the defined state of charge. Above the defined state of charge, electrical load 22 is configured to completely consume energy supplied via induction interface 14, by wake-up and/or synchronization pulses. To be more precise, the supplied energy is completely consumed by electrical load 22 within an interval between two wake-up and/or synchronization pulses.

Battery device 10 includes an input unit 28. Input unit 28 is coupled to processing unit 32, which is configured to set the defined state of charge. Input unit 28 forms, for example, an electrical interface for connecting, in particular, for wirelessly connecting, an external input device, such as, in particular, a computer, a smart phone and/or a keyboard. The defined state of charge may be set by a user and/or in the factory, using input unit 28. The defined state of charge is set as a maximum state of charge of battery cell unit 12. Alternatively, the defined state of charge is set below a maximum state of charge of battery cell unit 12. In this connection, the defined state of charge may be set to a value between 70% and 90% of a maximum state of charge of battery cell unit 12.

In a discharging mode, electrical load 22 is configured to discharge battery cell unit 12, until a particular state of charge is reached. The particular state of charge may be fixed or adjustable by input unit 28. By way of example, the particular state of charge is set to a lowest possible state of charge of battery cell unit 12. Battery cell unit 12 is damaged below the lowest possible state of charge of battery cell unit 12. In order to measure a storage capacity of battery cell unit 12, battery cell unit 12 is discharged through electrical load 22, down to the particular state of charge. Subsequently, battery cell unit 12 is charged up completely, and the amount of energy supplied is measured.

Inductive charging device 30 is configured to charge battery device 10 inductively. Inductive charging device 30 is configured to monitor the state of battery device 10 with the aid of wake-up and/or synchronized pulses. In one mode of battery device 10, electrical energy is received by induction, in order to charge battery cell unit 12. Electrical load 22 of battery device 10 prevents overcharging of battery cell unit 12. Electrical load 22 of battery device 10 prevents, in particular, overcharging of battery cell unit 12 by wake-up and/or synchronization pulses.

The invention claimed is:

1. A battery device, comprising:
   a battery cell unit;
   at least one induction interface configured, in at least one reception operating state, to receive electrical energy for charging the battery cell unit by induction; and
   at least one electrical load which is configured to be activated above a defined state of charge of the battery cell unit.

2. The battery device of claim 1, wherein the at least one electrical load is configured to prevent the state of charge from increasing above the defined state of charge.

3. The battery device of claim 1, wherein above the defined state of charge, the at least one electrical load is configured to consume, at least partially, energy supplied via the induction interface, in particular, by wake-up and/or synchronization pulses.

4. The battery device of claim 1, further comprising:
   an input unit, via which the defined state of charge may be set, in particular, by a user.

5. The battery device of claim 1, wherein the defined state of charge is set as a maximum state of charge of the battery cell unit.

6. The battery device of claim 1, wherein the defined state of charge is set below a maximum state of charge of the battery cell unit.

7. The battery device of claim 1, wherein, in particular, in a discharging mode, the electrical load is configured to discharge the battery cell unit, until a particular state of charge is reached.

8. A system, comprising:
   at least one battery device, including:
      a battery cell unit;
      at least one induction interface configured, in at least one reception operating state, to receive electrical energy for charging the battery cell unit by induction; and
      at least one electrical load which is configured to be activated above a defined state of charge of the battery cell unit; and
   an inductive charging device;
   wherein the system is configured to monitor a state of the at least one battery device.

9. The system of claim 8, wherein the at least one electrical load of the battery device prevents overcharging of the battery cell unit, in particular, overcharging of the battery cell unit by wake-up and/or synchronization pulses.

10. A method for operating a battery device, the method comprising:
    receiving, via at least one induction interface, which together with a battery cell unit forms the battery device, in at least one reception operating state, electrical energy for charging the battery cell unit by induction, wherein the battery device includes the battery cell unit and the at least one induction interface; and
    at least one electrical load which is configured to be activated above a defined state of charge of the battery cell unit;
    wherein at least one electrical load of the battery device prevents overcharging of the battery cell unit.

11. The method of claim 10, wherein the at least one electrical load of the battery device prevents overcharging of the battery cell unit, in particular, overcharging of the battery cell unit by wake-up and/or synchronization pulses.

12. An electronic device, comprising:
    at least one battery device, including:
       a battery cell unit;
       at least one induction interface configured, in at least one reception operating state, to receive electrical energy for charging the battery cell unit by induction; and
       at least one electrical load which is configured to be activated above a defined state of charge of the battery cell unit.

* * * * *